United States Patent [19]
Ho

[11] Patent Number: 5,615,258
[45] Date of Patent: Mar. 25, 1997

[54] PORTABLE TELEPHONE HOLDER

[76] Inventor: Wun-Shing Ho, 148, Sec. 2, Zhuang Jing Road, Taoyuan City, Taiwan

[21] Appl. No.: 680,001

[22] Filed: Jul. 15, 1996

[51] Int. Cl.$^6$ ....................................... H04M 1/00
[52] U.S. Cl. ...................... 379/428; 379/455; 379/454; 379/449
[58] Field of Search ..................... 379/428, 455, 379/454, 449, 446; 455/90, 89

[56] References Cited

U.S. PATENT DOCUMENTS

| | | |
|---|---|---|
| 5,033,709 | 7/1991 | Yuen ........................................ 379/454 |
| 5,179,590 | 1/1993 | Wang ....................................... 379/454 |
| 5,187,744 | 2/1993 | Richter ..................................... 379/455 |
| 5,222,132 | 6/1993 | Rioux, Jr. ................................. 379/455 |
| 5,457,745 | 10/1995 | Wang ....................................... 379/454 |

*Primary Examiner*—Ahmad F. Matar
*Assistant Examiner*—Keith Ferguson
*Attorney, Agent, or Firm*—Peterson, Wicks, Nemer & Kamrath, P.A.

[57] ABSTRACT

A portable telephone holder comprises a bottom plate, a cover covering the bottom plate, two lateral flaps disposed at two sides of the cover, a bottom block disposed beneath the cover, two coupling sliders disposed in the cover, two plastic casings disposed on the bottom block, and four rubber sleeves disposed on the cover.

1 Claim, 4 Drawing Sheets

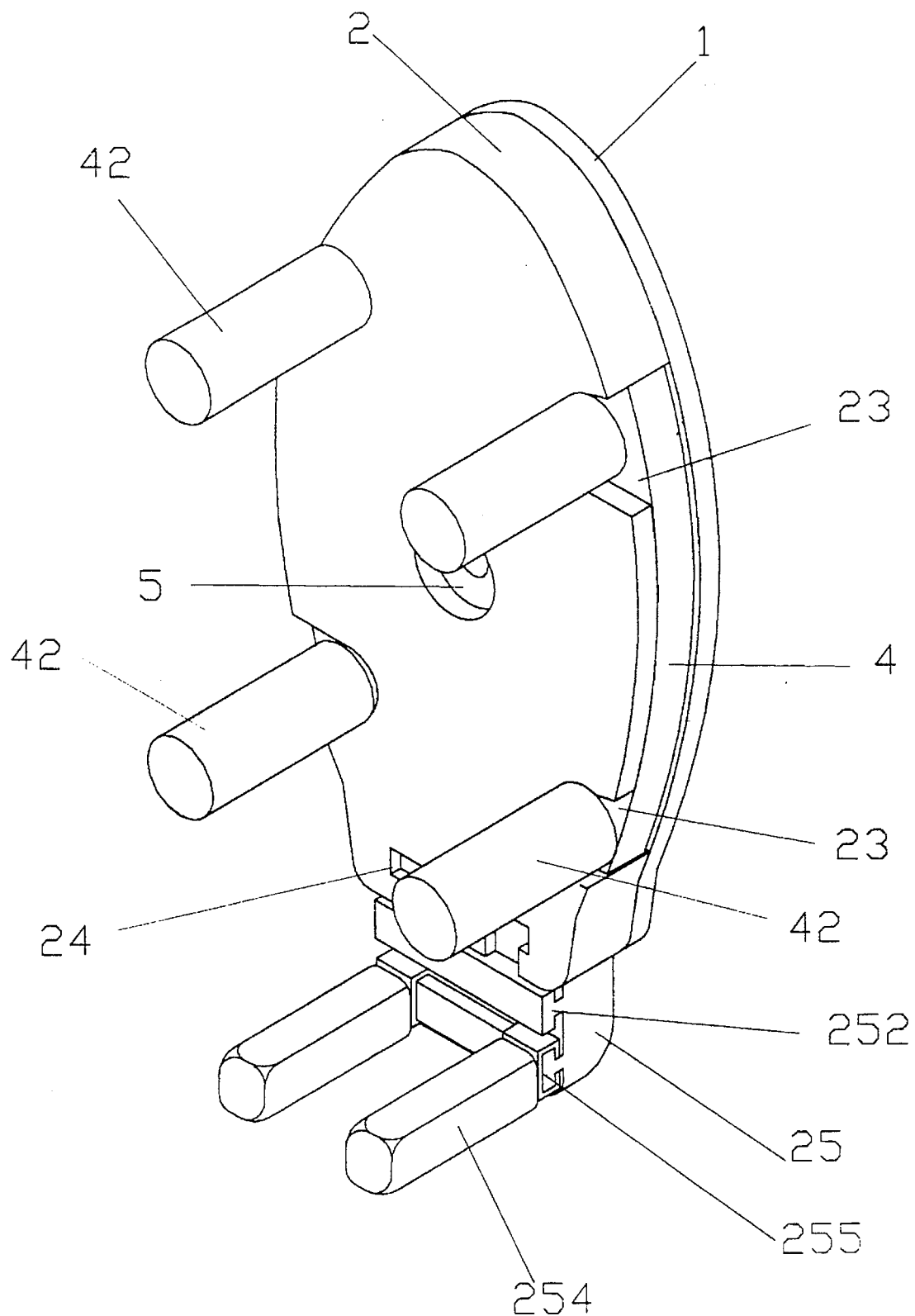
F I G. 1

PORTABLE TELEPHONE HOLDER

BACKGROUND OF THE INVENTION

The invention relates to a portable telephone holder. More particularly, the invention relates to a portable telephone holder which has a simple mechanism.

U.S. Pat. No. 5,305,381 has disclosed a telephone cradle. However, the ratchet mechanism in the telephone cradle is very complex. The movement of a spring-loaded wall is very slow.

SUMMARY OF THE INVENTION

An object of the invention is to provide a portable telephone holder which has a simple mechanism to clamp a portable telephone.

Accordingly, a portable telephone holder comprises a bottom plate, a cover covering the bottom plate, a left and right lateral flaps disposed at two sides of the cover, a bottom block disposed beneath the cover, a first and second coupling sliders disposed in the cove, and a left upper, left lower, right upper and right lower rubber sleeves disposed on the cover. A first, second, third and fourth notches are formed on a left upper, left lower, right upper and right lower periphery rim of the cover. A first, second, third and fourth recess holes are formed on a left upper, left lower, right upper and right lower portions of the cover. A center hole is formed on a center of the cover. Two bottom grooves are formed on a bottom of the cover. A round hole is formed on a center of the bottom plate. A first, second, third and fourth threaded holes are formed on a left upper, left lower, right upper and right lower portions of the bottom plate. Each of the left and right lateral flaps has an upper and lower arms, an upper and lower posts disposed on the corresponding upper and lower arms, and a snap pin thereon. Each of the first and second coupling sliders has an elastic curved plate extending upward, an elongated recess, a slot, a strip and an inserted hole. An inner wall of the left lateral flap abuts a left side of the cover. An inner wall of the right lateral flap abuts a right side of the cover. The first and second coupling sliders are overlapped. Each inserted hole receives the corresponding snap pin, respectively. The upper and lower posts of the left lateral flap are inserted in a first and second rubber sleeves, respectively. The upper and lower posts of the right lateral flap are inserted in a third and fourth rubber sleeves, respectively. A bottom block has two upper blocks inserted in the corresponding bottom grooves, and two slide rails to receive two levers. A first and second plastic casings enclose the corresponding levers, respectively. A bolt passes through the center hole, the slots and the round hole. A nut fastens the bolt. A first, second, third and fourth screws pass through the corresponding first, second, third and fourth threaded holes and the corresponding first, second, third and fourth recess holes to fasten the bottom plate and the cover. The bolt is unscrewed. A portable telephone is inserted in a spacing defined by the first, second, third and fourth rubber sleeves and the first and second plastic casings. The elastic curved plates force the left and right lateral flaps to extend outward slightly so that the portable telephone can pass through the spacing easily. Then the user can press the first, second, third and fourth rubber sleeves against the portable telephone. Then the bolt is screwed again.

BRIEF DESCRIPTION OF THE DRAWINGS

FIG. 1 is a perspective assembly view of a portable telephone holder of a preferred embodiment in accordance with the invention;

DETAILED DESCRIPTION OF THE INVENTION

Figure 2:
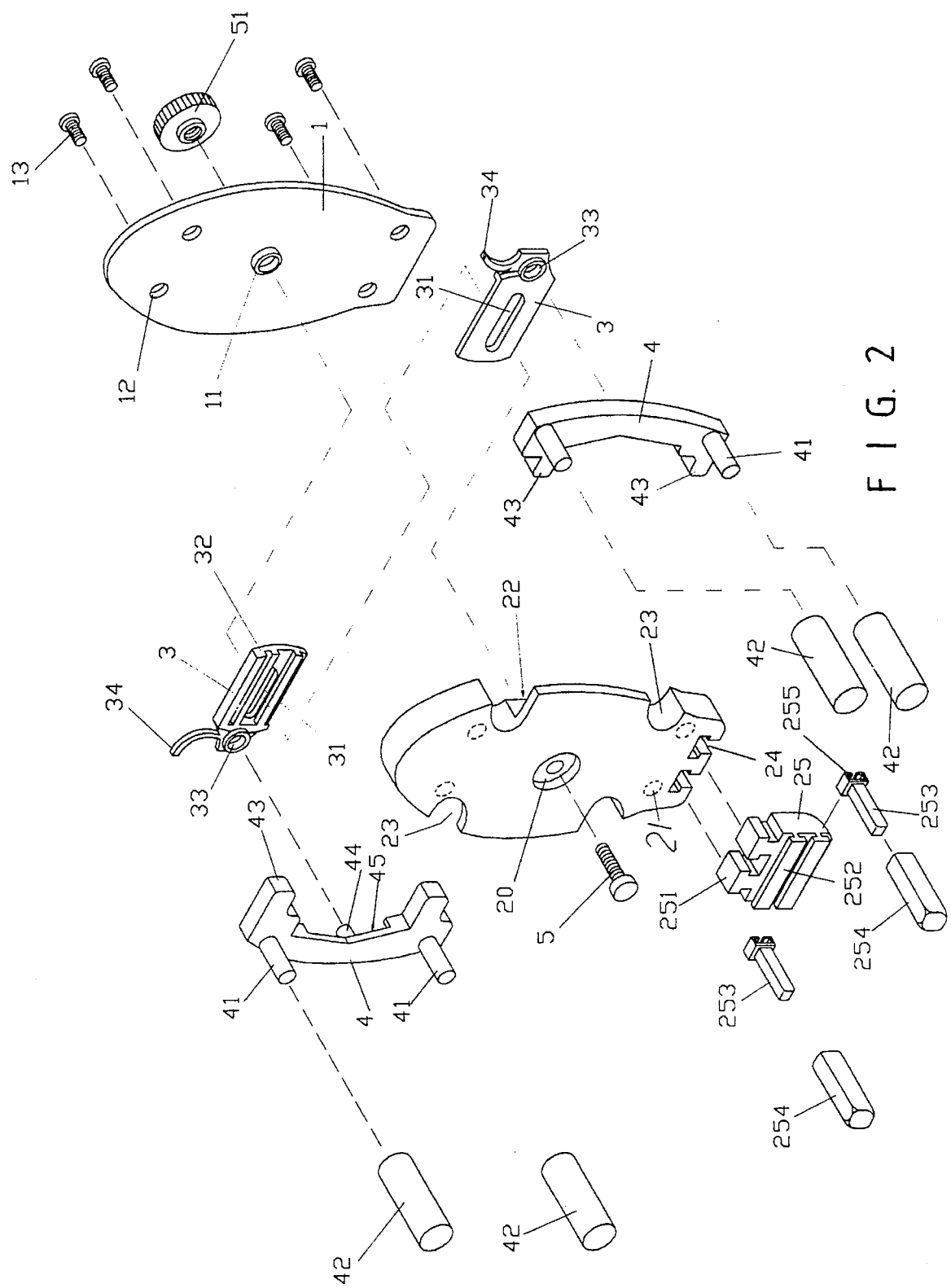
FIG. 2 is a perspective assembly view of FIG. 1.
Figure 3:
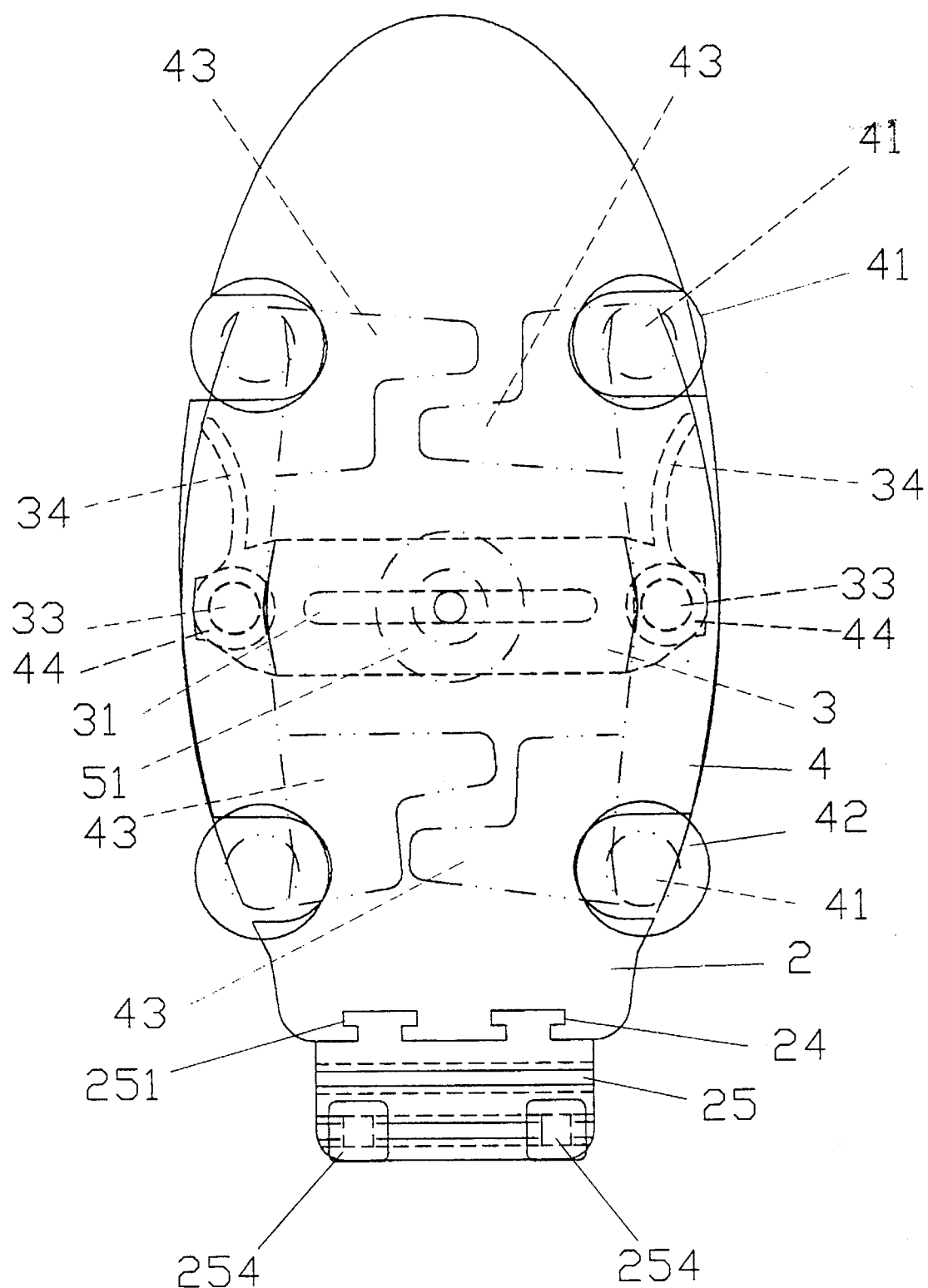
FIG. 3 is top plan view of FIG. 1.

Referring to FIGS. 1 to 3, a portable telephone holder comprises a bottom plate 1, a cover 2 covering the bottom plate 1, a left and right lateral flaps 4 disposed at two sides of the cover 2, a bottom block 25 disposed beneath the cover 2, a first and second coupling sliders 3 disposed in the cove 2, and a left upper, left lower, right upper and right lower rubber sleeves 42 disposed on the cover 2. A first, second, third and fourth notches 23 are formed on a left upper, left lower, right upper and right lower periphery rim of the cover 2. A first, second, third and fourth recess holes 21 are formed on a left upper, left lower, right upper and right lower portions of the cover 2. A center hole 20 is formed on a center of the cover 2. Two bottom grooves 24 are formed on a bottom of the cover 2. A round hole 11 is formed on a center of the bottom plate 1. A first, second, third and fourth threaded holes 12 are formed on a left upper, left lower, right upper and right lower portions of the bottom plate 1. Each of the left and right lateral flaps 4 has an upper and lower arms 43, an upper and lower posts 41 disposed on the corresponding upper and lower arms 43, and a snap pin 44 thereon. Each of the first and second coupling sliders 3 has an elastic curved plate 34 extending upward, an elongated recess 32, a slot 31, a strip 35 and an inserted hole 33. An inner wall 44 of the left lateral flap 4 abuts a left side of the cover 2. An inner wall 44 of the right lateral flap 4 abuts a right side of the cover 2. The first and second coupling sliders 3 are overlapped. Each inserted hole 33 receives the corresponding snap pin 44, respectively. The upper and lower posts 41 of the left lateral flap 4 are inserted in a first and second rubber sleeves 42, respectively. The upper and lower posts 41 of the right lateral flap 4 are inserted in a third and fourth rubber sleeves 42, respectively. A bottom block 25 has two upper blocks 251 inserted in the corresponding bottom grooves 24, and two slide rails 252 to receive two levers 253. A first and second plastic casings 254 enclose the corresponding levers 253, respectively. A bolt 5 passes through the center hole 20, the slots 31 and the round hole 11. A nut 51 fastens the bolt 5. A first, second, third and fourth screws 13 pass through the corresponding first, second, third and fourth threaded holes 12 and the corresponding first, second, third and fourth recess holes 21 to fasten the bottom plate 1 and the cover 2.

Figure 4:
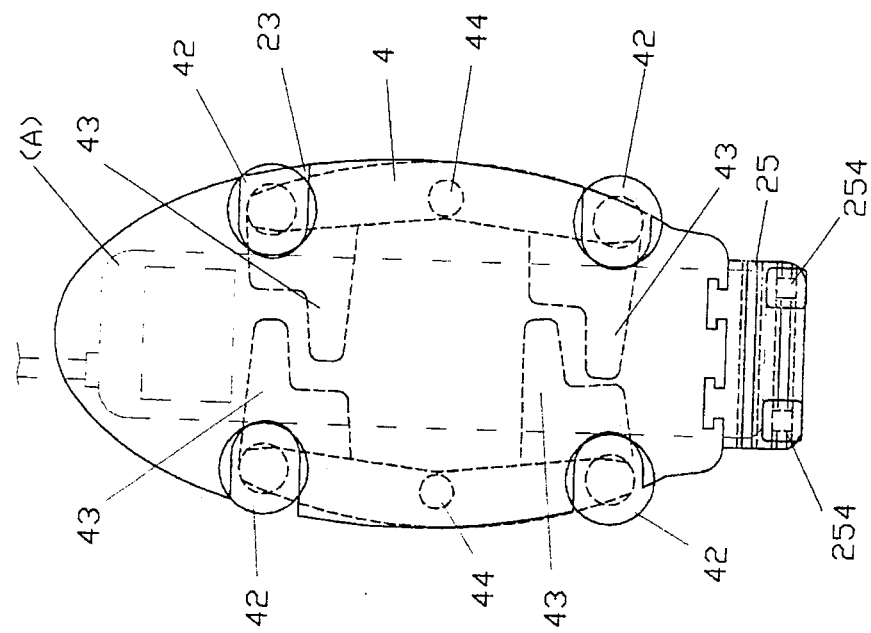
FIG. 4 is a schematic view illustrating a portable telephone holder clamping a portable telephone.
Figure 5:
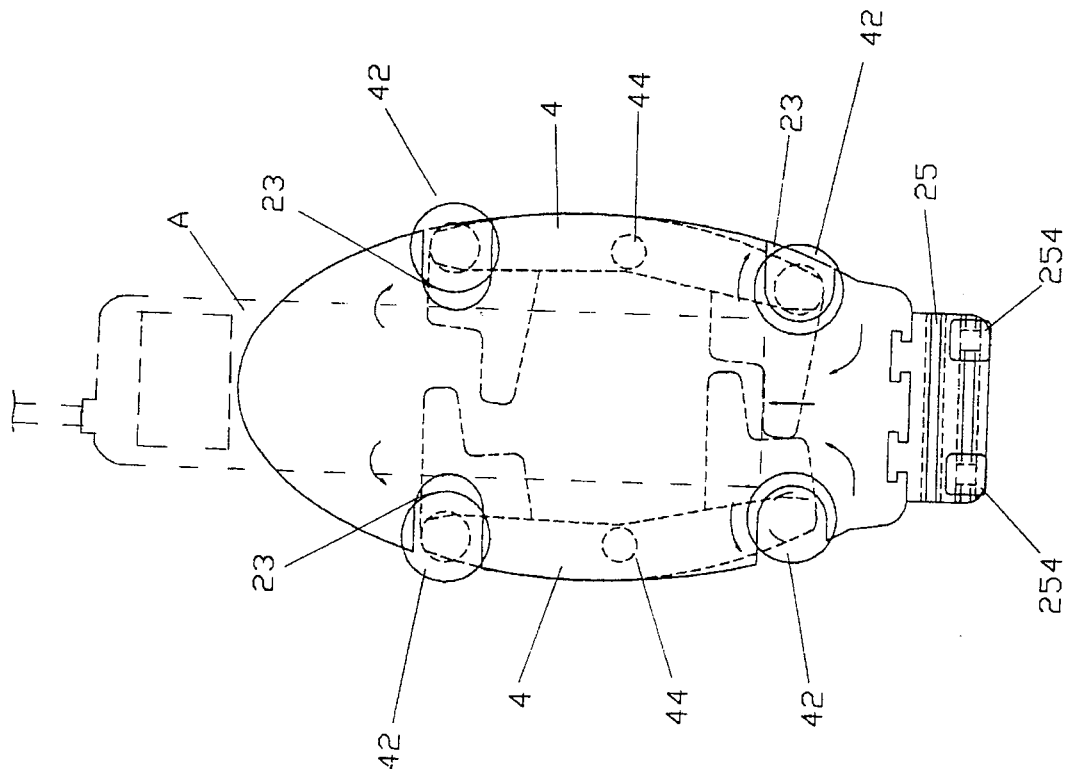
FIG. 5 is a schematic view illustrating a portable telephone releasing from a portable telephone holder.

Referring to FIGS. 3 to 5, the bolt 5 is unscrewed. A portable telephone A is inserted in a spacing defined by the first, second, third and fourth rubber sleeves 42 and the first and second plastic casings 254. The elastic curved plates 34 force the left and right lateral flaps 4 to extend outward slightly so that the portable telephone A can pass through the spacing easily. Then the user can press the first, second, third and fourth rubber sleeves 42 against the portable telephone A. Then the bolt 5 is screwed again.

The invention is not limited to the above embodiment but various modification thereof may be made. Further, various changes in form and detail may be made without departing from the scope of the invention.

I claim:
1. A portable telephone holder comprises:

a bottom plate, a cover covering the bottom plate, a left and right lateral flaps disposed at two sides of the cover, a bottom block disposed beneath the cover, a first and second coupling sliders disposed in the cove, and a left upper, left lower, right upper and right lower rubber sleeves disposed on the cover;

a first, second, third and fourth notches formed on a left upper, left lower, right upper and right lower periphery rim of the cover;

a first, second, third and fourth recess holes formed on a left upper, left lower, right upper and right lower portions of the cover;

a center hole formed on a center of the cover;

two bottom grooves formed on a bottom of the cover;

a round hole formed on a center of the bottom plate;

a first, second, third and fourth threaded holes formed on a left upper, left lower, right upper and right lower portions of the bottom plate;

each of the left and right lateral flaps having an upper and lower arms, an upper and lower posts disposed on the corresponding upper and lower arms, and a snap pin thereon;

each of the first and second coupling sliders having an elastic curved plate extending upward, an elongated recess, a slot, a strip and an inserted hole;

an inner wall of the left lateral flap abutting a left side of the cover;

an inner wall of the right lateral flap abutting a right side of the cover;

the first and second coupling sliders overlapped together;

each inserted hole receiving the corresponding snap pin, respectively;

the upper and lower posts of the left lateral flap inserted in a first and second rubber sleeves, respectively;

the upper and lower posts of the right lateral flap inserted in a third and fourth rubber sleeves, respectively;

a bottom block having two upper blocks inserted in the corresponding bottom grooves, and two slide rails to receive two levers;

a first and second plastic casings enclosing the corresponding levers, respectively;

a bolt passing through the center hole, the slots and the round hole;

a nut fastening the bolt;

a first, second, third and fourth screws passing through the corresponding first, second, third and fourth threaded holes and the corresponding first, second, third and fourth recess holes to fasten the bottom plate and the cover.

\* \* \* \* \*